(12) United States Patent
Carvajal et al.

(10) Patent No.: US 12,243,660 B2
(45) Date of Patent: Mar. 4, 2025

(54) DETECTION APPARATUS COMPRISING A RESONANT ELECTRICAL CIRCUIT LOCATED WITHIN A NUCLEAR FUEL ROD

(71) Applicant: Westinghouse Electric Company LLC, Cranberry Township, PA (US)

(72) Inventors: Jorge V. Carvajal, Irwin, PA (US); Jeffrey L. Arndt, Pittsburgh, PA (US); Shawn C. Stafford, Scottdale, PA (US); Melissa M. Heagy, Butler, PA (US); John R. Abel, II, Allison Park, PA (US); Emre Tatli, Pasadena, CA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/481,740

(22) Filed: Oct. 5, 2023

(65) Prior Publication Data

US 2024/0071637 A1 Feb. 29, 2024

Related U.S. Application Data

(63) Continuation of application No. 17/074,443, filed on Oct. 19, 2020, now Pat. No. 11,817,221, which is a
(Continued)

(51) Int. Cl.
*G21C 17/10* (2006.01)
*G21C 3/16* (2006.01)
(Continued)

(52) U.S. Cl.
CPC ............. *G21C 17/102* (2013.01); *G21C 3/16* (2013.01); *G21C 17/112* (2013.01); *G01L 7/041* (2013.01);
(Continued)

(58) Field of Classification Search
CPC ....... G21C 17/102; G21C 3/16; G21C 17/112
(Continued)

(56) References Cited

U.S. PATENT DOCUMENTS 3,087,886 A 4/1963 Robinson
3,296,864 A 1/1967 Wellesley et al.
(Continued)

FOREIGN PATENT DOCUMENTS

JP S63019504 A 1/1988
JP 3431660 B2 7/2003
(Continued)

OTHER PUBLICATIONS

International Search Report and Written Opinion for International PCT Application No. PCT/US2018/064684, dated Sep. 4, 2019.
(Continued)

*Primary Examiner* — Jack W Keith
*Assistant Examiner* — Daniel Wasil
(74) *Attorney, Agent, or Firm* — K&L Gates LLP

(57) ABSTRACT

A nuclear fuel rod includes a cladding comprising an interior region. A pressure transmission apparatus is configured to measure pressure in the interior region. Fuel pellets and a resonant electrical circuit are in the interior region. The resonant electrical circuit is configured to generate a pulse that travels wirelessly from the interior region through the cladding. A frequency of the pulse varies based on pressure measured by the pressure transmission apparatus. The frequency of the pulse is indicative of the pressure within the interior region.

12 Claims, 9 Drawing Sheets

Related U.S. Application Data continuation of application No. 16/214,445, filed on Dec. 10, 2018, now Pat. No. 10,832,825.

(60) Provisional application No. 62/691,178, filed on Jun. 28, 2018, provisional application No. 62/596,311, filed on Dec. 8, 2017.

(51) Int. Cl.
   *G21C 17/112* (2006.01)
   *G01L 7/04* (2006.01)
   *G01N 29/036* (2006.01)
   *G21C 17/06* (2006.01)
   *H04Q 9/00* (2006.01)

(52) U.S. Cl.
   CPC ........... *G01N 29/036* (2013.01); *G21C 17/06* (2013.01); *H04Q 9/00* (2013.01)

(58) Field of Classification Search
   USPC ........................................................ 376/247
   See application file for complete search history.

(56) References Cited

U.S. PATENT DOCUMENTS

| | | | |
|---|---|---|---|
| 3,597,316 A * | 8/1971 | Lynworth | G21C 17/112 376/247 |
| 3,879,612 A | 4/1975 | Foster | |
| 4,943,683 A | 7/1990 | Utsumomiya et al. | |
| 5,021,210 A | 6/1991 | Utsunomiya et al. | |
| 5,418,823 A | 5/1995 | Kervinen et al. | |
| 5,577,088 A * | 11/1996 | Senevat | G01N 29/07 376/247 |
| 5,745,538 A | 4/1998 | Heibel | |
| 6,252,923 B1 | 6/2001 | Iacovino et al. | |
| 8,693,613 B2 | 4/2014 | Bueno et al. | |
| 10,832,825 B2 | 11/2020 | Carvajal et al. | |
| 2012/0177166 A1 | 7/2012 | Seidel et al. | |
| 2013/0058448 A1 | 3/2013 | Smith | |
| 2013/0083879 A1 | 4/2013 | Heibel | |
| 2016/0050469 A1 | 2/2016 | Subiry | |
| 2017/0206989 A1 | 7/2017 | James et al. | |
| 2017/0206990 A1 | 7/2017 | Carvajal | |
| 2018/0218797 A1 | 8/2018 | Petrosky | |

FOREIGN PATENT DOCUMENTS

| | | |
|---|---|---|
| JP | 2011149936 A | 8/2011 |
| KR | 1020160036963 A | 4/2016 |
| WO | 2014197063 A2 | 12/2014 |
| WO | 2019113571 A1 | 6/2019 |
| WO | 2019156735 A2 | 8/2019 |

OTHER PUBLICATIONS

International Search Report and Written Opinion for International PCT Application No. PCT/US2018/064687, dated Mar. 22, 2019.
International Preliminary Report on Patentability for International PCT Application No. PCT/US2018/064684, dated Jun. 9, 2020.
International Preliminary Report on Patentability for International PCT Application No. PCT/US2018/064687, dated Jun. 9, 2020.
Supplementary Partial European Search Report for corresponding European Patent Application No. EP18905523.9, dated Jul. 30, 2021.
Supplementary Search Report for corresponding European Application No. 18886576.0, dated Sep. 20, 2021.
Supplementary Search Report for corresponding European Application No. 18905523.9, dated Feb. 24, 2022.

\* cited by examiner

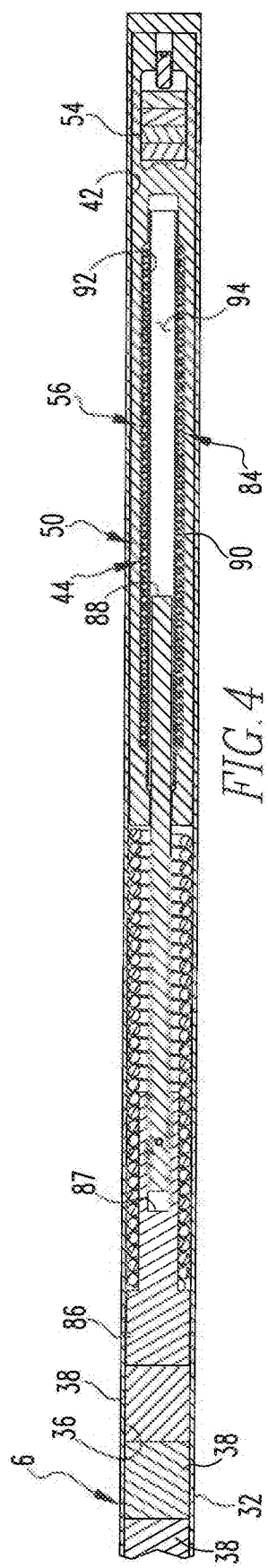
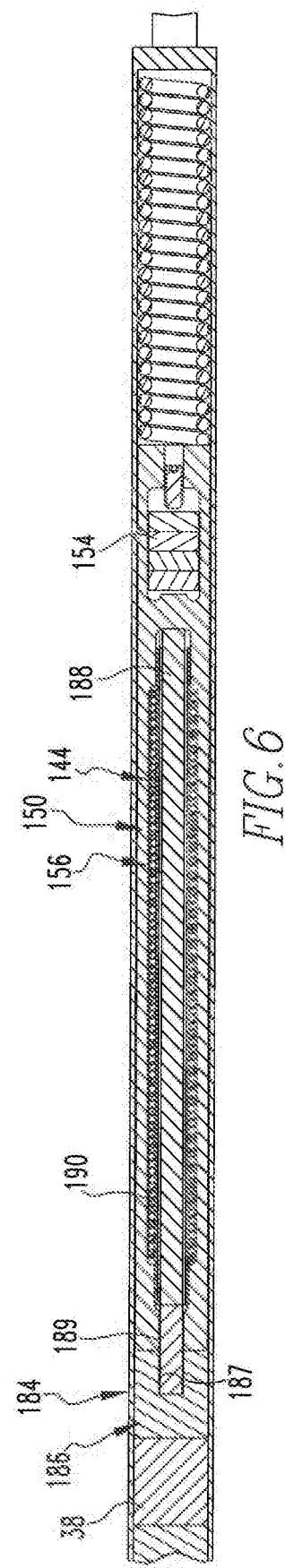
FIG. 4
FIG. 6

DETECTION APPARATUS COMPRISING A RESONANT ELECTRICAL CIRCUIT LOCATED WITHIN A NUCLEAR FUEL ROD

CROSS-REFERENCE TO RELATED APPLICATIONS

This application is a continuation application claiming priority under 35 U.S.C. § 120 to U.S. patent application Ser. No. 17/074,443, entitled DETECTION APPARATUS COMPRISING A RESONANT ELECTRICAL CIRCUIT LOCATED WITHIN A NUCLEAR FUEL ROD, filed Oct. 19, 2020, which is a continuation application claiming priority under 35 U.S.C. § 120 to U.S. patent application Ser. No. 16/214,445, entitled DETECTION APPARATUS USABLE IN A NUCLEAR REACTOR, AND ASSOCIATED METHOD, filed Dec. 10, 2018, now U.S. U.S. Pat. No. 10,832,825, issued Nov. 10, 2020, which claims priority from U.S. Provisional Patent Application Ser. No. 62/691,178, entitled MEASUREMENT METHODS FOR FUEL PELLET TEMPERATURE, SWELLING AND PRESSURE CHANGE INSIDE A NPP FUEL ROD, filed Jun. 28, 2018 and U.S. Provisional Patent Application No. 62/596,311, entitled FUEL ROD REAL-TIME PASSIVE INTEGRAL SENSOR WITH REMOTE INDUCTIVE INTERROGATOR, filed Dec. 8, 2017, the entire disclosures of which are hereby incorporated herein by reference herein.

BACKGROUND

1. Field

The disclosed and claimed concept relates generally to nuclear power equipment and, more particularly, to a detection apparatus usable with a fuel rod and an instrumentation tube of a fuel assembly of a nuclear reactor.

2. Related Art

In many state-of-the-art nuclear reactor systems, in-core sensors are employed for directly measuring the radioactivity within the core at a number of axial elevations. Thermocouple sensors are also located at various points around the core at an elevation where the coolant exits the core to provide a direct measure of coolant outlet temperature at various radial locations. These sensors are used to directly measure the radial and axial distribution of power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor is generally disposed within an instrument thimble within various fuel assemblies around the core, does not require an outside source of electrical power to produce the current, is commonly referred to as a self-powered detector, and is more fully described in U.S. Pat. No. 5,745,538, issued Apr. 28, 1998, and assigned to the Assignee of this invention.

Another type of sensor capable of measuring various parameters of the core, and which is typically disposed within the instrument thimbles in various fuel assemblies around the core, is described in U.S. patent application Ser. No. 15/417,504, filed Jan. 27, 2017. This type of sensor employs a transmitter device that includes a self-powered neutron detector structured to detect neutron flux, a capacitor electrically connected in parallel with the neutron detector, a gas discharge tube having an input end and an output end, and an antenna electrically connected to the output end in series with a resonant circuit. The input end of the gas discharge tube is electrically connected to the capacitor. The antenna is structured to emit a signal comprising a series of pulses representative of the intensity of the neutron flux monitored by the self-powered detector. Other core parameters can also be monitored by their effects on altering the values of the inductance and capacitance of the resonant circuit.

Still another in-core sensor, one which does not require signal leads to communicate its output out of the reactor, is disclosed in U.S. Pat. No. 4,943,683, which describes an anomaly diagnosis system for a nuclear reactor core having an anomaly detecting unit incorporated into a fuel assembly of the nuclear reactor core, and a transmitter-receiver provided outside the reactor vessel. The transmitter-receiver transmits a signal wirelessly to the anomaly detecting unit and receives an echo signal generated by the anomaly detecting unit wirelessly. When the anomaly detecting unit detects an anomaly in the nuclear reactor core, such as an anomalous temperature rise in the fuel assembly, the mode of the echo signal deviates from a reference signal. Then the transmitter-receiver detects the deviation of the echo signal from the reference signal and gives an anomaly detection signal to a plant protection system. The sensor actually monitors coolant temperature around the fuel assembly in which it is mounted.

While each of the foregoing sensors directly monitors conditions within the core of a nuclear reactor, such sensor have not been without limitation. Improvements thus would be desirable.

SUMMARY

None of the aforementioned sensors directly monitors conditions within a nuclear fuel rod in the core during reactor operation. Before advanced fuel cladding materials can be put into commercial use they have to be rigorously tested to receive regulatory approval. The existing methodology for testing advanced fuel cladding materials requires fuel rods to be tested over several fuel cycles and examined at the end of the irradiation test. This is a lengthy process that takes several years during which time fuel cladding data is not available. In the existing method, critical data is only obtained during the post irradiation examination activities. What is desired is an in-pile sensor that can be placed within a fuel rod, endure the hazardous conditions over several fuel cycles, and does not require penetrations into the cladding of the fuel rod.

This invention achieves the foregoing objective by providing a nuclear fuel rod real-time passive integral detection apparatus with a remote inductive or magnetic interrogator (also known as pulse induction). The detection apparatus includes a resonant electrical circuit configured to be supported within an interior of a nuclear fuel rod and structured to generate a generally sinusoidal response pulse in response to an incoming excitation pulse and transmit the response pulse in the form of a magnetic wave that travels through a cladding of the nuclear fuel rod to another location within a reactor in which the nuclear fuel rod is housed, wherein a characteristic of the generated pulse is indicative of a condition of the fuel rod. The detection apparatus also includes a transmitter structured to be positioned outside the cladding, in the reactor, in the vicinity of the fuel rod and configured to generate the excitation pulse and transmit the excitation pulse through the cladding to the resonant electrical circuit, and a receiver structured to be supported within the reactor outside of the cladding, in the vicinity of the nuclear fuel rod, and configured to receive the response pulse and, in response to the response pulse, communicates a signal to an electronic processing apparatus outside of the reactor.

Preferably, the resonant circuit is supported within a plenum of the nuclear fuel rod. In one such embodiment the characteristic of the response pulse is indicative of the center-line fuel pellet temperature. In another such embodiment the characteristic of the response pulse is indicative of fuel pellet elongation. In still another such embodiment the characteristic of the response pulse is indicative of fuel rod internal pressure. Furthermore, the characteristic of the response pulse may be configured to be simultaneously indicative of a plurality of conditions of the fuel rod.

An additional resonant electrical circuit can also be located in a bottom portion of the fuel rod in order to provide measurements at two different axial locations. Preferably, the resonant circuit comprises a plurality of circuit components whose properties such as capacitance and inductance are selected to create a response pulse having a unique frequency, which can be interpreted to identify the particular nuclear fuel rod from which the generated pulse emanated.

In addition, the detection apparatus may include a calibration circuit that is configured to be supported within the interior of the nuclear fuel rod and structured to generate a static calibration signal when interrogated by the excitation pulse from the transmitter, which can be received by the receiver and used to correct the response pulse received by the receiver for any signal change associated with component degradation or temperature drift.

Accordingly, an aspect of the disclosed and claimed concept is to provide an improved detection apparatus usable with a fuel rod from among a plurality of fuel rods of a fuel assembly, the fuel rod having a cladding that has an interior region, the fuel rod being situated within a nuclear reactor, the detection apparatus being cooperable with an electronic processing apparatus situated outside of the reactor. The detection apparatus can be generally stated as including a transmitter that is structured to be positioned outside the cladding and inside the nuclear reactor in the vicinity of the fuel rod and structured to generate an excitation pulse and to transmit the excitation pulse through the cladding and into the interior region, an electrical circuit apparatus having a resonant electrical circuit that is structured to be supported within the interior region and to generate a response pulse in response to the excitation pulse and to transmit the response pulse in the form of a magnetic field signal that is structured to travel from the interior region and through the cladding, the resonant electrical circuit comprising a plurality of circuit components, at least one circuit component of the plurality of circuit components having a property which is structured to vary in response to a condition of the fuel rod and which, responsive to a change in the condition, is structured to cause the property and the response pulse to vary with the change in the condition and to be indicative of the condition, and a receiver structured to be supported within the nuclear reactor outside the cladding and in the vicinity of the fuel rod, the receiver being structured to receive the response pulse and to communicate to the electronic processing apparatus an output responsive to the response pulse.

Another aspect of the disclosed and claimed concept is to provide an improved method of detecting a condition of a fuel rod from among a plurality of fuel rods of a fuel assembly, the fuel rod having a cladding that has an interior region, the fuel rod being situated within a nuclear reactor. The method can be generally stated as including employing a detection apparatus to detect the condition, the detection apparatus being cooperable with an electronic processing apparatus situated outside of the nuclear reactor, the detection apparatus having a transmitter that is structured to be positioned outside the cladding and inside the nuclear reactor in the vicinity of the fuel rod, an electrical circuit apparatus having a resonant electrical circuit that is structured to be supported within the interior region, the resonant electrical circuit comprising a plurality of circuit components, at least one circuit component of the plurality of circuit components having a property which is structured to vary in response to a condition of the fuel rod and which, responsive to a change in the condition, is structured to cause the property and the response pulse to vary with the change in the condition and to be indicative of the condition, and a receiver structured to be supported within the nuclear reactor outside the cladding and in the vicinity of the fuel rod. The employing can be generally stated as including generating with the transmitter an excitation pulse and transmitting the excitation pulse through the cladding and into the interior region, generating with the resonant electrical circuit a response pulse in response to the excitation pulse and transmitting the response pulse in the form of a magnetic field signal from the interior region and through the cladding, and receiving on the receiver the response pulse and communicating to the electronic processing apparatus an output responsive to the response pulse.

BRIEF DESCRIPTION OF THE DRAWINGS

A further understanding of the invention can be gained from the following Description when read in conjunction with the accompanying drawings in which:

FIG. 4 is a partially cut away depiction of a fuel rod within which an electrical circuit apparatus of the detection apparatus of FIG. 1 is situated;

FIG. 6 is a depiction of another fuel rod, partially cut away, and including an electrical circuit apparatus in accordance with a second embodiment of the disclosed and claimed concept;

Similar numerals refer to similar parts throughout the specification.

DESCRIPTION

Figure 1:
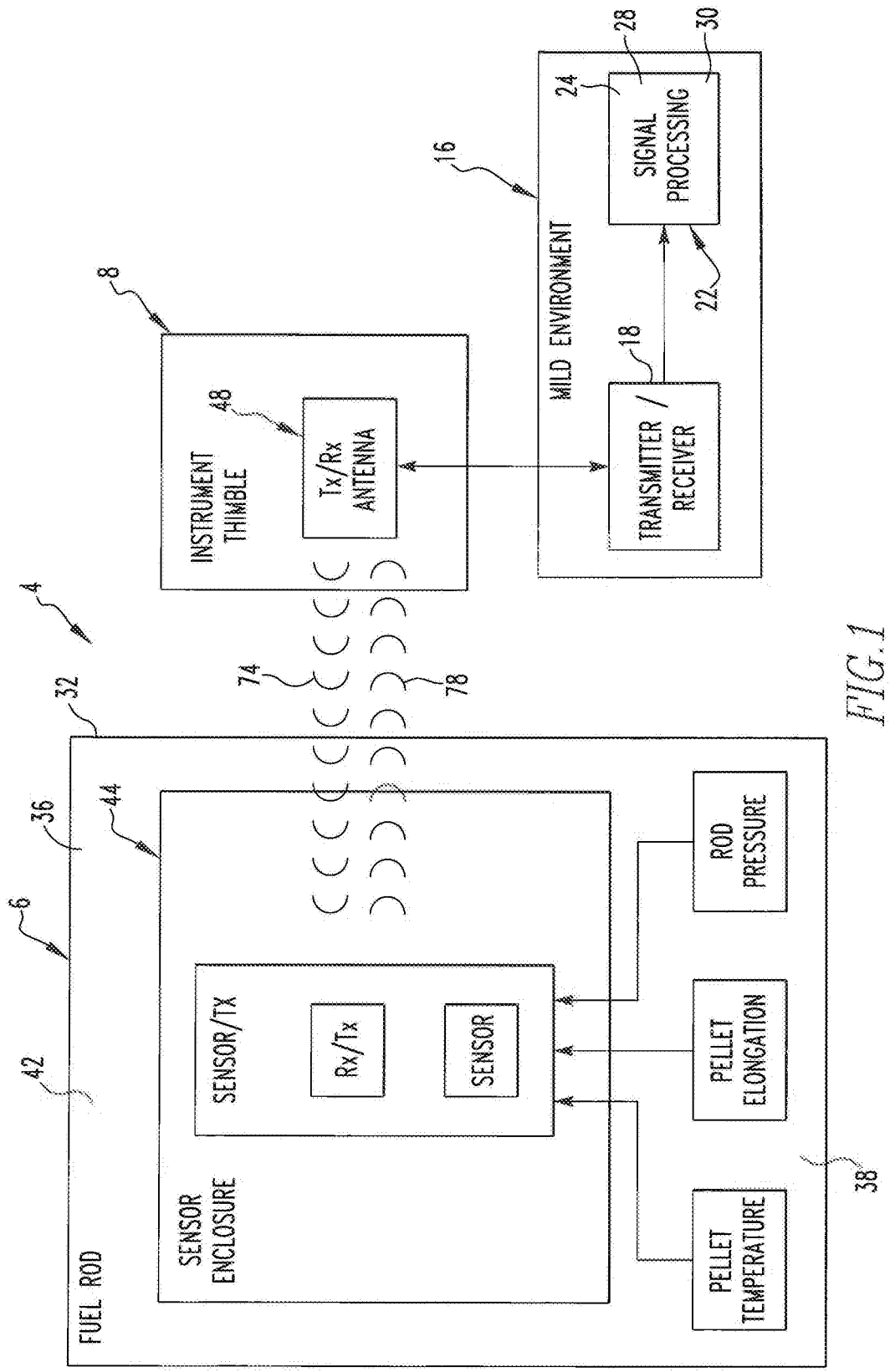
FIG. 1 is a functional schematic of an improved detection apparatus in accordance with a first embodiment of the disclosed and claimed concept that is usable with a fuel rod and an instrument thimble of a nuclear installation.
Figure 2:
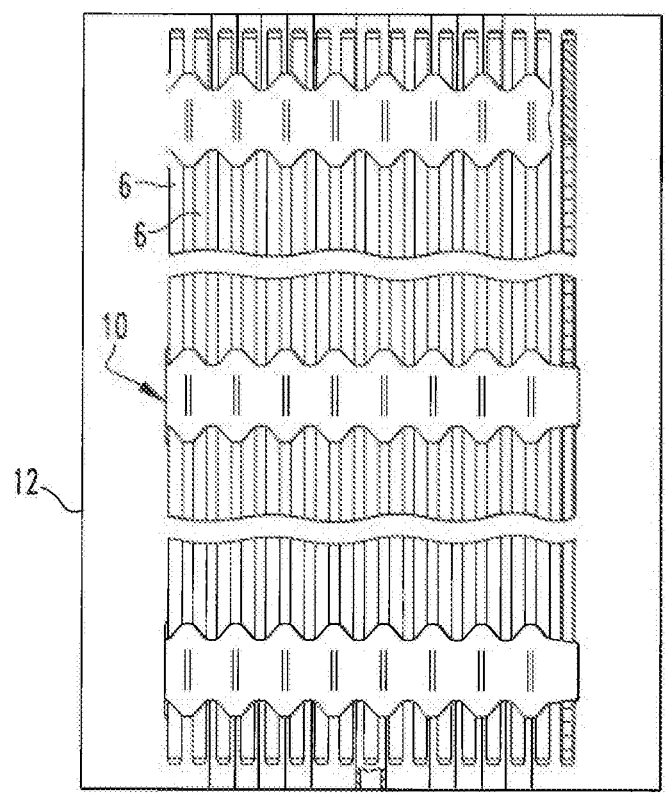
FIG. 2 is a schematic depiction of a nuclear installation having a nuclear reactor that includes a fuel assembly that, in turn, includes the fuel rod and instrument thimble with which the detection apparatus of FIG. 1 is usable.

An improved detection apparatus 4 in accordance with the disclosed and claimed concept is depicted generally in FIG. 1. The detection apparatus 4 is usable with a fuel rod 6 and an instrument thimble 8, such as are included in a fuel assembly 10 (FIG. 2) of a nuclear reactor that is depicted schematically in FIG. 2 at the numeral 12, which signifies a containment of the nuclear reactor 12.

The detection apparatus 4 is situated within the containment of the nuclear reactor 12, and the detection apparatus 4 is cooperable with an electronic processing apparatus 16 that is situated external to the containment of the nuclear reactor 12. The detection apparatus 4 is thus intended to be situated within the harsh environment situated within the interior of the containment of the nuclear reactor 12 whereas the electronic processing apparatus 16 is situated in a mild environment external to the containment of the nuclear reactor 12.

As can be understood from FIG. 1, the electronic processing apparatus 16 can be seen as including a transceiver 18 and a signal processor 22. The transceiver 18 is connected with a wired connection with an interrogation apparatus 48 that is situated in the instrument thimble 8. The signal processor 22 includes a processor and storage 24, with the storage 24 having stored therein a number of routines 28, and the storage 24 further having stored therein a number of data tables 30. The routines 28 are executable on the processor to cause the detection apparatus 4 to perform various operations, including receiving signals from the transceiver 18 and accessing the data tables 30 in order to retrieve values that correspond with aspect of the signals from the transceiver 18 that are representative of conditions inside the fuel rod 6.

As can further be understood from FIG. 1, the fuel rod 6 can be said to include a cladding 32 and to have an interior region 36 situated within the cladding 32 and a number of fuel pellets 38 situated within the interior region 36. As employed herein, the expression "a number of" and variations thereof shall refer broadly to any non-zero quantity, including a quantity of one. The fuel rod has a plenum 42 in generally a vertically upper end of the fuel rod 6.

The detection apparatus 4 can be said to include an electrical circuit apparatus 44 that is supported within the plenum 42 of the fuel rod 6 within the interior region 36 thereof. The detection apparatus 4 further includes the interrogation apparatus 48, which can be said to be situated within an interior of the instrument thimble 8. As is schematically depicted in FIG. 1, the electrical circuit apparatus 44 is situated within the interior region 36 and communicates with the interrogation apparatus 48 without any breaches or other openings being formed in the cladding 32, thereby advantageously keeping the cladding 32 intact and advantageously keeping the fuel pellets 38 fully contained within the interior region 36.

As can be further understood from FIG. 1, and as will be set forth in greater detail below, the electrical circuit apparatus 44 and the interrogation apparatus 48 communicate wirelessly with one another. Conditions within the interior region 36 of the fuel rod 6 can be said to include a temperature of the fuel pellets 38, an extent of physical elongation of the fuel pellets 38, and the ambient pressure within the interior of the fuel rod 6, by way of example. These three conditions are directly detectable by the electrical circuit apparatus 44 and are communicated through the interrogation apparatus 48 to the electronic processing apparatus 16. As will likewise be set forth in greater detail below, various embodiments are disclosed wherein the temperature and elongation of the fuel pellets 38 are detected in various ways, and wherein the ambient pressure within the interior region 36 of the fuel rod 6 is detected in various ways. It is understood that these properties are not intended to be limiting, and it is also understood that other properties potentially can be detectable without departing from the spirit of the instant disclosure.

Figure 3:
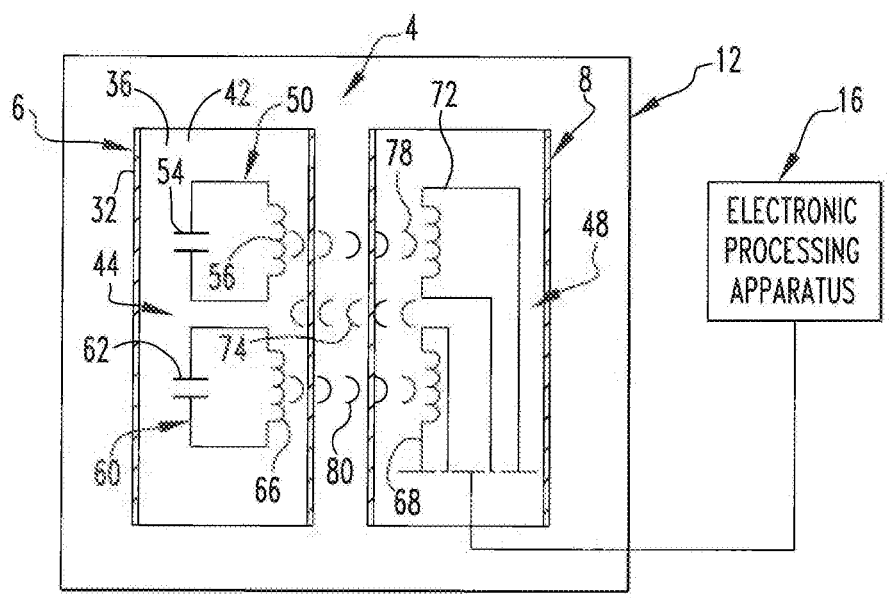
FIG. 3 is another schematic depiction of the detection apparatus of FIG. 1.

As can be understood from FIG. 3, the electrical circuit apparatus 44 can be said to include a resonant electrical circuit 50 that operates as a sensor and that includes a plurality of circuit components that include a capacitor 54 and an inductor 56. The circuit components have values or properties, such as the capacitance of the capacitor 54 and the inductance of the inductor 56, by way of example, which are selected to impart to the resonant electrical circuit 50 a unique nominal frequency which, when detected by the interrogation apparatus 48, is usable to identify the particular fuel rod 6 within which the electrical circuit apparatus 44 is situated.

In this regard, it is understood that a plurality of instances of the electrical circuit apparatus 44 can be situated in a plurality of corresponding fuel rod 6 of the fuel assembly 10. During operation of the detection apparatus 4, the interrogation apparatus 48 interrogates the electrical circuit apparatus 44 in order to receive a signal from the electrical circuit apparatus 44 that can be interpreted as being indicative of one or more of the properties or conditions within the interior region 36 of the fuel rod 6, such as temperature and/or elongation of the fuel pellets 38, ambient pressure within the interior region 36 of the fuel rod 6, etc., and by way of example. The fuel assembly 10 includes a large number of the fuel rods 6, and a subset of the fuel rods 6 of the fuel assembly 10 are envisioned to each have a corresponding electrical circuit apparatus 44 situated therein. When the interrogation apparatus 48 sends out its interrogation signal, the various electrical circuit apparatuses 44 will responsively output a signal that is transmitted through the cladding 32 or the corresponding fuel rod 6 and is received by the interrogation apparatus 48. The various signals from the various electrical circuit apparatuses 44 each has a unique nominal frequency that is selected by selecting the various properties of the capacitor 54 and the inductor 56, by way of example, of the electrical circuit apparatus 44 in order to provide such a signature frequency.

The electric processing apparatus 16 is thus able to use the frequencies of the various detected signals to determine which signal corresponds with which fuel rod 6 of the fuel assembly 10.

As can further be understood from FIG. 3, the electrical circuit apparatus 44 additionally includes a resonant electrical circuit 60 that is usable as a calibration circuit. That is, the resonant electrical circuit 50 is usable as a sensor circuit that senses the property or condition within the interior region 36 of the fuel rod 6, and the resonant electrical circuit 60 is usable as a calibration circuit to compensate the signal from the resonant electrical circuit 50 for component degradation, temperature drift, and the like. In this regard, the resonant electrical circuit 60 includes a capacitor 62 and an inductor 66 that are selected to have the same material properties as the capacitor 54 and the inductor 56 of the resonant electrical circuit 50. However, and as will be set forth in greater detail below, the resonant electrical circuit 50 is exposed to the condition that is being measured within the interior region 36, such as the temperature and/or elongation of the fuel pellets 38, and/or the ambient pressure within the interior region 36, by way of example. The resonant electrical circuit 60, being usable as a calibration circuit, is generally not so exposed to the condition being measured. Such calibration is provided by employing a ratiometric analysis such as will be discussed in greater detail elsewhere herein.

As can further be understood from FIG. 3, the interrogation apparatus 48 can be said to include a transmitter 68 and a receiver 72. The transmitter 68 is configured to output an excitation pulse 74 which is in the form of a magnetic field signal that is capable of being transmitted through the cladding of the instrument thimble 8 within which the interrogation apparatus 48 is situated and is further capable of being transmitted through the cladding 32 of the fuel rod 6. The excitation pulse 74 is thus receivable by the inductor 56 and the inductor 66 of the resonant electrical circuits 50 and 60, respectively, to induce a resonant current in the resonant electrical circuits 50 and 60 in a known fashion. The induced currents in the resonant electrical circuits 50 and 60 result in the outputting of a response pulse 78 from the resonant electrical circuit 50 and a response pulse 80 from the resonant electrical circuit 60. The responses pulses 78 and 80 are in the form of magnetic field signals, which are not merely radio frequency signals, and which can be transmitted from the electrical circuit apparatus 44 through the cladding 32 and through the cladding of the instrument thimble 8 and thus be received on the receiver 72.

Figure 5A:
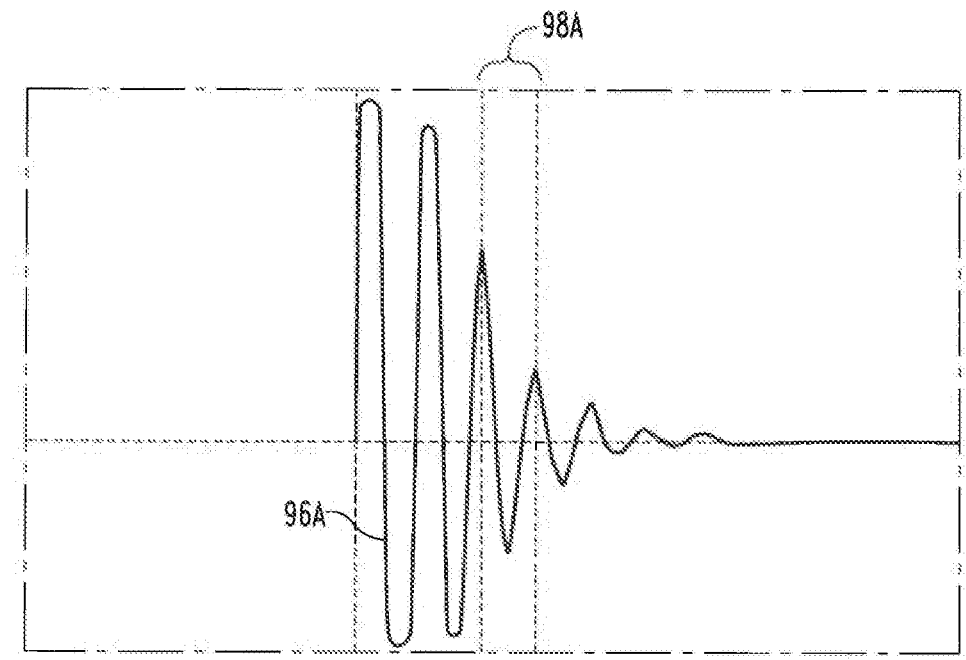
FIG. 5A is a depiction of a trace of an exemplary response signal that is output by the electrical circuit apparatus of FIG. 4.
Figure 5B:
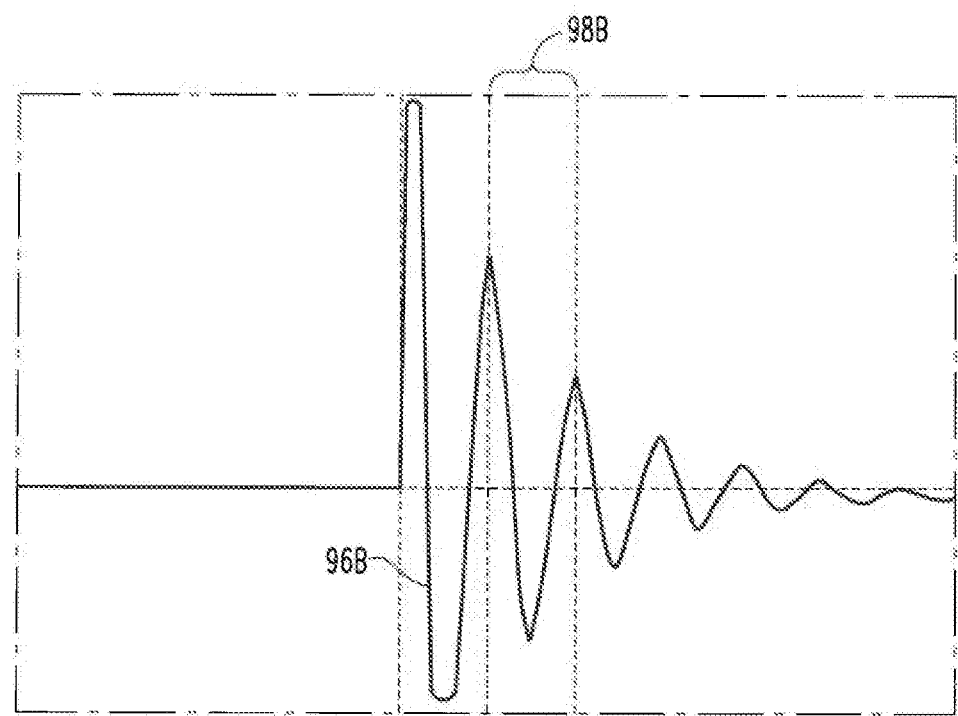
FIG. 5B is an exemplary alternative trace of an alternative response signal that is output by the electrical circuit apparatus of FIG. 4.

The excitation pulse 74 is of a generally sinusoidal configuration. The response pulses 78 and 80 are likewise sinusoidal pulses, but they are decaying sinusoidal signals, and it is noted that FIGS. 5A and 5B depict a pair of traces that are representative of two different response pulses 78. In this regard, the frequency of the response pulse 78 may correlate with one parameters within the fuel rod 6, such as temperature, the peak amplitude of the response pulse 78 may correspond with another parameter within the fuel rod 6, such as elongation of the fuel pellets 38, and a decay rate of the response pulse rate 78 may correlate with yet another parameter within the fuel rod 6, such as ambient pressure within the interior region 36. As such, the response pulse 78 may be correlated with a plurality of parameters or conditions within the interior region 36 of the fuel rod 6 within which the electrical circuit apparatus 44 is situated.

The aforementioned ratiometric analysis of the response pulses 78 and 80 typically involves taking a ratio of the response pulse 78 to the response pulse 80 or vice versa, in order to eliminate the effects of component degradation and temperature drift. For instance, the resonant electrical circuits 50 and 60 may degrade over time thus affecting the signal that is output therefrom. Likewise, the signals that are output from the resonant electrical circuits 50 and 60 can vary with temperature of the nuclear reactor 12. In order to compensate for these factors, it is assumed that the resonant electrical circuit 50 and the resonant electrical circuit 60 will degrade at substantially the same rate over time. Furthermore, the resonant electrical circuits 50 and 60 will be exposed to the same gross, i.e., overall, temperature within the interior of the nuclear reactor 12. By taking the ratio of the response pulses 78 and 80, such as the ratio of the frequencies, by way of example, and by using the ratio to look up in the data tables 30 a corresponding value for temperature, elongation, and/or pressure, the individual effects of component degradation and temperature drift in the resonant circuit 50 are eliminated. This is because the ratiometric signal is independent of component degradation and temperature drift since the resonant electrical circuits 50 and 60 are assumed to both experience the same component degradation and temperature drift.

As is best shown in FIG. 4, the electrical circuit apparatus 44 further includes a elongation transmission apparatus 84 that is situated within the interior region 36 of the fuel rod 6. The elongation transmission apparatus 84 includes a support 86 that is formed of a ceramic material in the depicted exemplary embodiment and which is abutted against the stack of fuel pellets 38. The support 86 has a receptacle 87 formed therein, and the elongation transmission apparatus 84 further includes an elongated element that is in the form of a ferritic rod 88 and that is received in the receptacle 87. The inductor 56 includes a coil 90 that is situated about and exterior surface of a tube 92 that is formed of a ceramic material. The tube 92 has an interior 94 within which an end of the ferritic rod 88 opposite the support 86 is receivable.

As the fuel pellets 38 increase in temperature, they thermally expand, thus causing the fuel pellets 38 to push the support 86 and thus the ferritic rod 88 in a rightward direction in FIG. 4, and thus to be received to a relatively greater extent within the interior 94, which alters the inductance of the inductor 56. Such an alteration of the inductance of the inductor 56 adjusts the frequency of the resonant electrical circuit 50, which is detectable when the excitation pulse 74 excites an electrical resonance in the resonant electrical circuit 50. The response pulse 78 from the resonant electrical circuit 50 thus has a frequency that is indicative of the extent of elongation of the fuel pellets 38. The response pulses 78 and 80 are received by the receiver 72, and the receiver 72 responsively sends a number of signals to the electronic processing apparatus 16. The electronic processing apparatus 16 uses the ratio of the response pulses 78 and 80, or vice versa, to retrieve from the data tables 30 an identity of the fuel rod 6 within which the electrical circuit apparatus 44 is situated, based upon the signature nominal frequency of the response pulses 78 and 80, and additionally retrieves from the data tables 30 a value that corresponds with the extent of elongation of the fuel pellets 38 as exemplified by the response pulse 78. These data can then be sent into a main data monitoring system of the nuclear reactor 12, by way of example, or elsewhere.

In this regard, it is noted that the calibration circuit represented by the resonant electrical circuit 60 is not strictly critical for the detection of the properties or conditions such as fuel elongation, center line fuel temperature, and ambient pressure, within the interior of the various fuel rods 6. As such, it is understood that the calibration circuit 60 is optional in nature and is usable in order to simplify the data gathering operation and to overcome limitations associated with component degradation and temperature drift, but the calibration circuit 60 is not considered to be necessary to the operation of the detection apparatus 4. As such, it is understood the various other types of electrical circuit apparatuses in the various other embodiments that are described elsewhere herein may or may not include a calibration circuit without departing from the spirit of the instant disclosure. In this regard, it is noted that the calibration circuit 60 is described only in terms of the electrical circuit apparatus 44, but it is understood that any of the other embodiments of the other electrical circuit apparatuses herein may incorporate such a calibration circuit.

As suggested above, the response pulse 78 is a decaying sine wave that has properties such as a peak amplitude, a frequency, and a rate of decay. FIG. 5A depicts a trace 96A of one such response pulse 78, and FIG. 5B depicts another trace 96B of another such response pulse 78. It can be understood from FIGS. 5A and 5B that the trace of FIG. 5A has a greater peak amplitude, a higher frequency (as indicated by the shorter period 98A compared with the period 98B in FIG. 5B), and further has a higher rate of decay than the trace 96B of FIG. 5B. As such, while any one of temperature, pressure, and elongation can be directly measured from the frequency of either of the traces 96A and 96B, it is understood that a plurality of such parameters can be simultaneously derived from each such trace 96A and 96B depending upon the configuration of the routines 28 and the data tables 30, by way of example.

It thus can be said that elongation of the fuel pellets 38 can affect the inductance value of the inductor 56 by virtue of the relative movement of the ferritic rod 88 with respect to the coil 90. This affects the frequency of the response pulse 78 that is output by the resonant electrical circuit 50, and which is therefore detectable by the electronic processing apparatus 16 through the use of the routines 28 and the data table 30.

FIG. 6 depicts an improved electrical circuit apparatus 144 in accordance with a second embodiment of the disclosed and claimed concept. The electrical circuit apparatus 144 includes a resonant electrical circuit 150 having a capacitor 154 and an inductor 156, and is thus similar in that fashion to the electrical circuit apparatus 44. However, the electrical circuit apparatus 144 includes a temperature transmission apparatus 184 that enables measurement of the center line fuel pellet temperature within the fuel rod 6. Specifically, the temperature transmission apparatus 184 includes a modified fuel pellet 186 that is modified to have a receptacle 187 formed therein. The temperature transmission apparatus 184 further includes a tungsten rod 189 that is an elongated element and that is received in the receptacle 187. While the elongated element 189 is depicted in the exemplary embodiment described herein as being formed of tungsten, it is understood that any of a wide variety of other refractory metals and alloys such as molybdenum and the like can be used in place of tungsten. The temperature transmission apparatus 184 further includes a ferritic rod 188 that is abutted against the tungsten rod 189, it being understood that the tungsten rod 189 is abutted with the modified fuel pellet 186. The inductor 156 includes a coil 190 that is situated directly on the ferritic rod 188.

Figure 7:
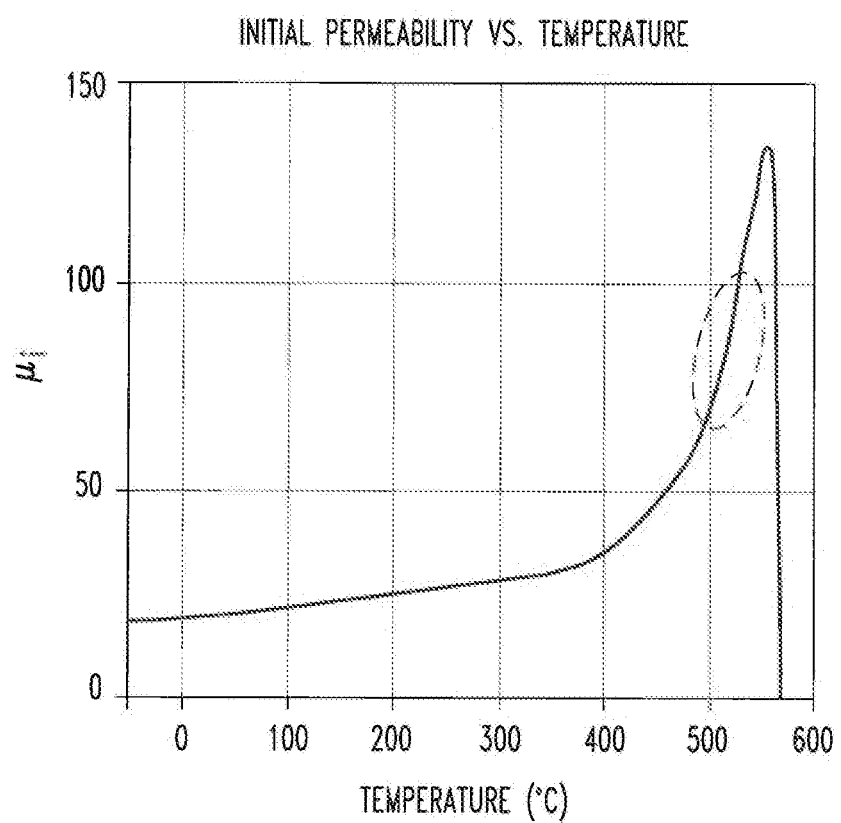
FIG. 7 is a graph depicting variation in permeability as a function of temperature of a ferritic rod of the electrical circuit apparatus of FIG. 6.

During operation, the heat that is generated by the fuel pellets 38 and the modified fuel pellet 186 is conducted through the tungsten rod 189 and thereafter through the ferritic rod 188, thereby causing the temperature of the ferritic rod 188 to correspond with the temperature of the fuel pellets 38 and the modified fuel pellet 186. The permeability of the ferritic rod 188 changes as a function of temperature, and the change in permeability with temperature is depicted in a graph that is shown generally in FIG. 7. A portion of the graph of FIG. 7 is encircled and demonstrates the temperature that is typically seen by the ferritic rod 188 after the heat from the modified fuel pellet 186 is transferred to the ferritic rod 188 by the tungsten rod 189 and demonstrates, due to the steepness of the curve at the indicated location in FIG. 7, the correlation between temperature of the ferritic rod 188 and permeability thereof.

The permeability of the ferritic rod 188 which, as noted, varies as a function of temperature, affects the inductance of the inductor 156 with the result that the frequency of the response pulse 78 that is output by the resonant circuit 150 varies directly with the permeability of the ferritic rod 188 and thus with the temperature of the fuel pellets 38 and the modified fuel pellet 186. As such, the temperature of the fuel pellets 38 and the modified fuel pellet 186 can be measured by detecting the response pulse 78 that is output by the resonant electrical circuit 150 through the use of the routines 28 and the retrieval from the data tables 30 of a temperature that corresponds with the detected frequency of the response pulse 78.

Figure 8:
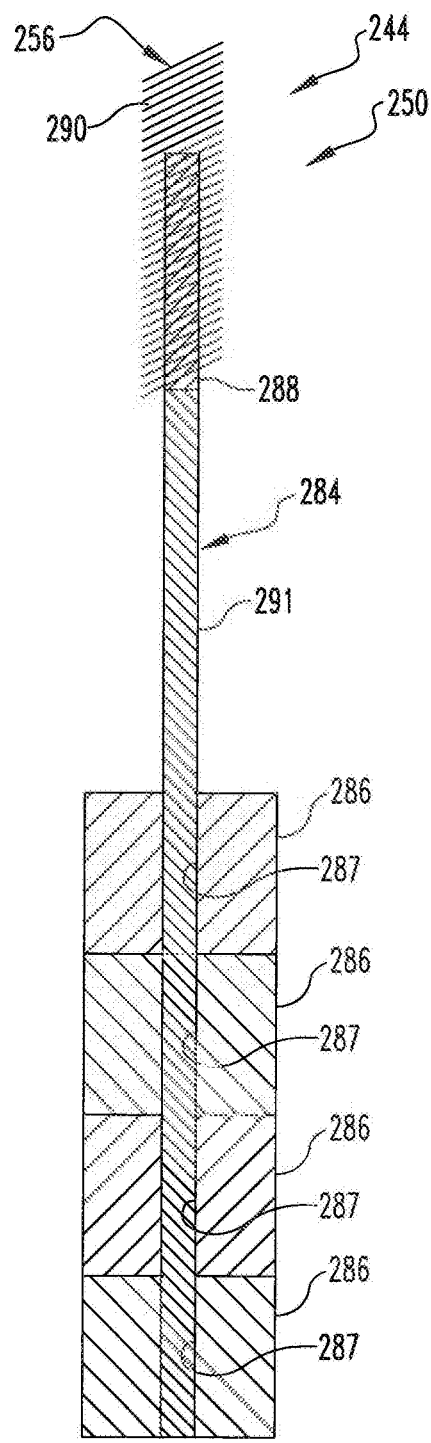
FIG. 8 is a schematic depiction of an electrical circuit apparatus in accordance with a third embodiment of the disclosed and claimed concept that can be used in a fuel rod such as is depicted generally in FIG. 2.

An improved electrical circuit apparatus 244 in accordance with a third embodiment of the disclosed and claimed concept is depicted in FIG. 8 and is usable in a fuel rod in a fashion similar to the electrical circuit apparatus 44. The electrical circuit apparatus 244 is receivable in the interior region 36 of the fuel rod 6 and includes a resonant electrical circuit 250 and a temperature transmission apparatus 284 that detect the temperature of a set of modified fuel pellets 286. The modified fuel pellets 286 each have a receptacle 287 formed therein. The temperature transmission apparatus 284 includes an amount of liquid metal 291 that is liquid during operation of the nuclear reactor 12. The temperature transmission apparatus 284 further includes a ferritic rod 288 that is engaged with the liquid metal 291 and is buoyantly floated thereon and is receivable in the interior of a coil 290 of an inductor 256 of the resonant electrical circuit 250. The liquid metal 291 expands and contracts with temperature increases and decreases, respectively, of the modified fuel pellets 286. The position of the ferritic rod 288 with respect to the coil 290 is thus directly dependent upon the centerline temperature of the modified fuel pellets 286. Such position of the ferritic rod 288 with respect to the coil 290 affects the inductance of the inductor 256 and therefore correspondingly affects the frequency of the resonant electrical circuit 250. The response pulse 78 that is generated by the resonant electrical circuit 250 thus is receivable by the receiver 72 and is communicated to the electronic processing apparatus 16, and the routines 28 and the data tables 30 are employed to determine a corresponding temperature of the modified fuel pellets 286 and thus of the corresponding fuel rod 6.

Figure 9:
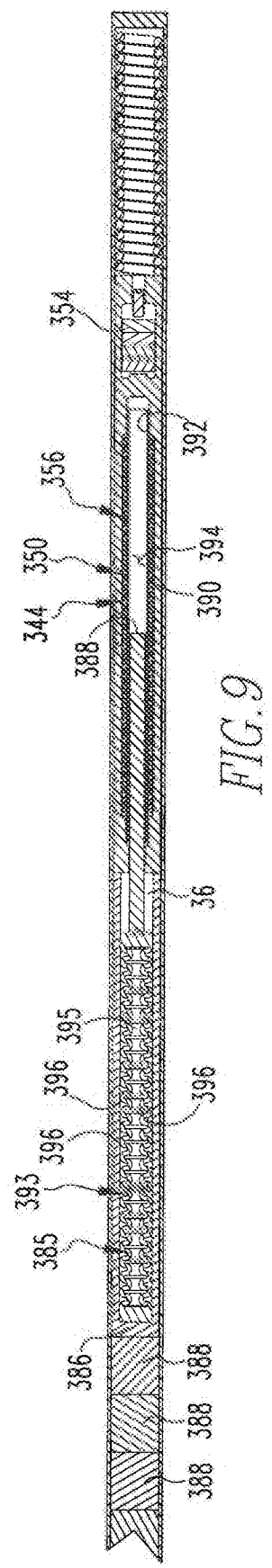
FIG. 9 is a schematic depiction of a fuel rod within which is situated an electrical circuit apparatus in accordance with a fourth embodiment of the disclosed and claimed concept.

FIG. 9 depicts an improved electrical circuit apparatus 344 in accordance with a fourth embodiment of the disclosed and claimed concept. The electrical circuit apparatus 344 is usable inside a fuel rod 6 and includes a resonant electrical circuit 350 and a pressure transmission apparatus 385. The pressure transmission apparatus 385 is configured to enable measurement of the ambient pressure within the interior of the fuel rod 6 and includes a support 386 that abuts the stack of fuel pellets 338. The pressure transmission apparatus 385 further includes a ferritic rod 388 and a vessel in the form of a bellows 393 having a hollow cavity 395 and further having a plurality of corrugations 396 formed therein. The hollow cavity 395 is open and is therefore in fluid communication with the interior region of the fuel rod 6. Moreover, an end of the bellows 393 opposite a ferritic rod 388 is affixed to the support 386.

The resonant electrical circuit 350 includes a capacitor 354 and further includes an inductor 356 having a coil 390 that is formed about the exterior of a hollow tube 392 having an interior 394 within which a ferritic rod 388 is receivable. The bellows 393 and the ferritic rod 388 are movably received on a support 386 and are biased by a spring in a direction generally toward the fuel pellets 338.

As is understood in the relevant art, as the nuclear reactor 12 is in operation, fission gases are produced that include one or more noble gases. Such fission gases increase the ambient pressure within the interior region of the fuel rod 6. Since the hollow cavity 395 is in fluid communication with the interior region of the fuel rod 6, the increased pressure in the interior region 36 bears upon bellows 393 within the hollow cavity 395 and causes the bellows 393 to expand axially, thereby moving the ferritic rod 388 with respect to the coil 390 and thereby affecting the inductance of the inductor 356. An increase in ambient pressure within the interior region 36 of the fuel rod 6 thus expands the bellows 393, thereby resulting in an incremental further reception of the ferritic rod 388 into the coil 390, which results in a corresponding change in inductance of the inductor 356.

The corresponding change in inductance of the inductor 356 affects in a predictable fashion the frequency of the resonant electrical circuit 350 and thus likewise affects the frequency of the response pulse 78 that is output by the resonant electrical circuit 350. As a result, when the response pulse 78 from the resonant electrical circuit 350 is received by the receiver 72 and is communicated to the electronic processing apparatus 16, the routines 28 and the data tables 30 are employed to obtain a corresponding value for the ambient pressure within the interior region 36 of the fuel rod 6. Such value for the ambient pressure can then be communicated to an enterprise data system of the nuclear reactor 12.

Figure 10:
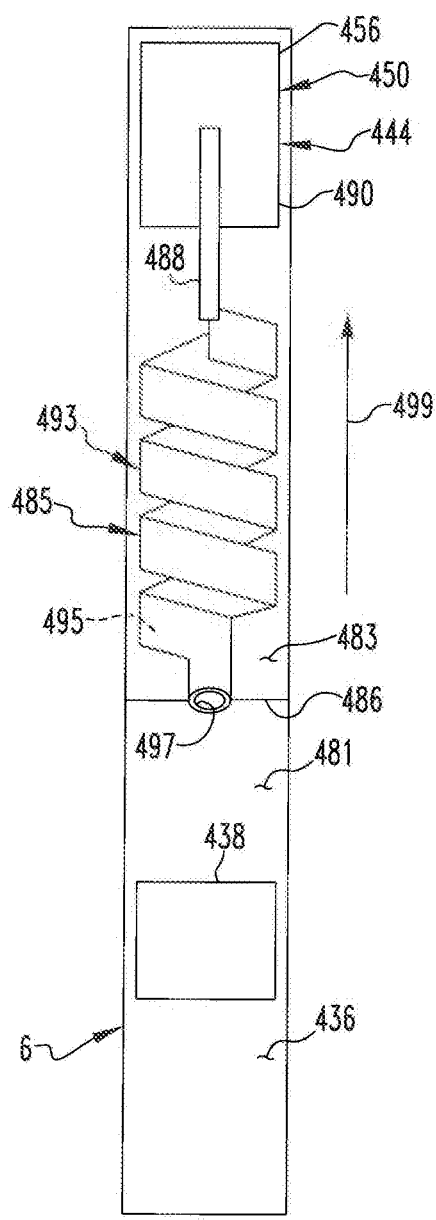
FIG. 10 is a schematic depiction of another fuel rod within which is situated another electrical circuit apparatus in accordance with a fifth embodiment of the disclosed and claimed concept.

An improved electrical circuit apparatus 444 in accordance with a fifth embodiment of the disclosed and claimed concept is depicted generally in FIG. 10. The electrical circuit apparatus 444 is situated within an interior region 436 of a fuel rod 6 and includes a resonant electrical circuit 450 that includes a capacitor and an inductor 456.

The electrical circuit apparatus 444 further includes a pressure transmission apparatus 485 that includes a vessel in the form of a Bourdon tube 493 which, in the depicted exemplary embodiment, includes a hollow tube that is formed in a helical shape. The hollow tube of the Bourdon tube 493 forms a hollow cavity 495, except that an inlet 497 is formed in an end of the Bourdon tube 493 and thus permits fluid communication with the interior of the Bourdon tube 493. More specifically, the electrical circuit apparatus 444 further includes a support 486 in the form of a seal that extends between the edges of the Bourdon tube 493 adjacent the inlet 497 and extends to an interior surface of the interior region 436 of the fuel rod 6. The support 486 thus divides the interior region 436 into a main portion 481 within which a number of fuel pellets 438 are situated and a sub-region 483 within which the Bourdon tube 493 and the inductor 456 are situated. The Bourdon tube 493 is also supported on the support 486. The support 486 resists fluid communication between the main portion 481 and the sub-region 483, except for the inlet 497 which permits fluid communication between the interior of the Bourdon tube 493 and the main portion 481.

The pressure transmission apparatus 485 further includes a ferritic rod 488 that is situated on the Bourdon tube 493 at an end thereof opposite the inlet 497. The inductor 456 includes a coil 490, and movement of the ferritic rod 488 in relation to the coil 490 changes the inductance of the inductor 456 such that the frequency of the response pulse 78 that is generated by the electrical circuit apparatus 444 changes corresponding to the ambient pressure within the main portion 481 of the interior region 436. More specifically, as fission gases accumulate in the main portion 481 of the interior region 436, the ambient pressure within the main portion 481 increases, as does the ambient pressure within the hollow cavity 495 of the Bourdon tube 493. Since the sub-region 483 does not experience the increased ambient pressure that is experienced by the main portion 481, and increase in the ambient pressure within the hollow cavity 495 of the Bourdon tube 493 results in expansion of the Bourdon tube 493 and resultant movement of the ferritic rod 488 in the direction of the arrow 499 with respect to the coil 490. This results in a corresponding change in the frequency of the response pulse 78 that is generated by the electrical circuit apparatus 444.

It thus can be seen that changes in ambient pressure within the main portion 481 of the interior region 436 result in a change in inductance of the inductor 456 and a corresponding change in the nominal frequency of the resonant electrical circuit 450 and a resultant change in the frequency of the response pulse 78 that is generated by the electrical circuit apparatus 444. When such response pulse 78 is received by the receiver 72, a corresponding signal is communicated to the electronic processing equipment 16, and the routines 28 and the data tables 30 are used to obtain a corresponding value for the ambient pressure within the interior region 436 for output as desired.

Figure 11:
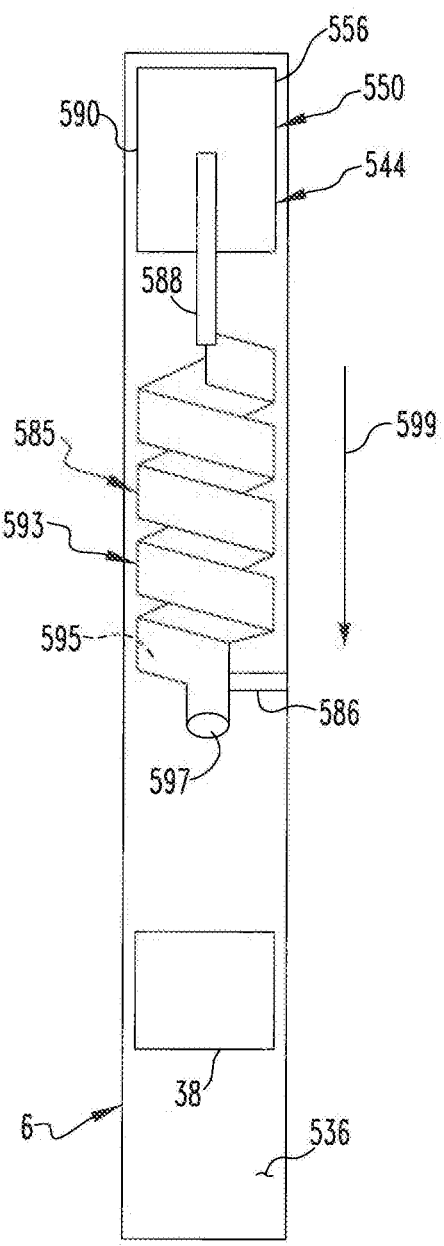
FIG. 11 is a schematic depiction of another fuel rod within which is situated another electrical circuit apparatus in accordance with a sixth embodiment of the disclosed and claimed concept.
Figure 12:
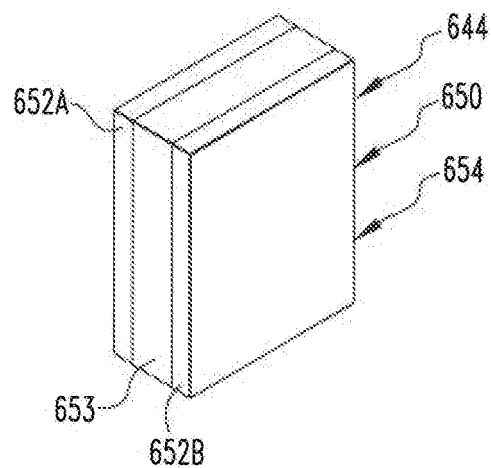
FIG. 12 is a schematic depiction of another electrical circuit apparatus in accordance with a seventh embodiment of the disclosed and claimed concept that can be used in a fuel rod such as is depicted generally in FIG. 2.

An improved electrical circuit apparatus 544 in accordance with a sixth embodiment of the disclosed and claimed concept is depicted generally in FIG. 11. The electrical circuit apparatus 544 is similar to the electrical circuit apparatus 444 in that a Bourdon tube 593 is employed as a vessel having a hollow cavity 595. In the electrical circuit apparatus 544, however, the Bourdon tube 593 includes a plug 597 at an end thereof opposite a ferritic rod 588 such that the hollow cavity 595 of the Bourdon tube is not in fluid communication with the interior region 536 of the fuel rod 6, and an increase in ambient pressure within the interior region 536 causes the Bourdon tube 593 to contract. The Bourdon tube 493 is supported on a support 586 in the vicinity of the plug 597, and a contraction of the Bourdon tube 493 due to increased ambient pressure within the interior region 536 thus moves the ferritic rod 588 in the direction of the arrow 599 with respect to the coil 590.

The electrical circuit apparatus 544 includes a resonant electrical circuit 550 having a capacitor and an inductor 556, and movement of the ferritic rod 588 with respect to the coil 590 of the inductor 556 changes the inductance of the inductor 556 and thus changes the nominal frequency of the resonant electrical circuit 550. The electrical circuit apparatus 544 thus includes a pressure transmission apparatus 585 that is similar to the pressure transmission apparatus 485, except that the pressure transmission apparatus 585 includes a Bourdon tube 593 whose hollow cavity 595 is not in fluid communication with the interior region 536 and thus contracts in the presence of an increased ambient pressure within the interior region 536.

An improved electrical circuit apparatus 644 in accordance with a seventh embodiment of the disclosed and claimed concept includes a resonant electrical circuit 650 having a capacitor 654 and an inductor. The capacitor 654 includes a pair of plates 652A and 652B that are separated by a dielectric material 653. The electrical circuit apparatus 644 is receivable within the interior region 36 of a fuel rod 6 in order to output a response pulse 78 whose frequency is adjusted responsive to a change in ambient pressure within the interior region 36 of the fuel rod 6.

More specifically, the dielectric 653 is hygroscopic in nature and is configured to absorb at least some of the fission gases that are generated during operation of the nuclear reactor 12. Such absorption of the fission gases by the dielectric 653 changes the dielectric constant of the dielectric 653, which adjusts the capacitance of the capacitor 654, with a corresponding effect on the frequency of the response pulse 78 that is generated by the resonant electrical circuit 650. As such, a change in the ambient pressure within the interior region 36 of the fuel rod 6 correspondingly affects the capacitance of the capacitor 654 and thus likewise correspondingly affects the frequency of the response pulse 78 that is generated by the resonant electrical circuit 650. When the response pulse 78 is received by the receiver 72, the receiver 72 responsively provides to the electronic processing apparatus 16 a signal which is used by the routines 28 in conjunction with the data tables 30 to obtain and output a value for the ambient pressure within the interior region 36 of the fuel rod 6 within which the electrical circuit apparatus 644 is situated.

Figure 13:
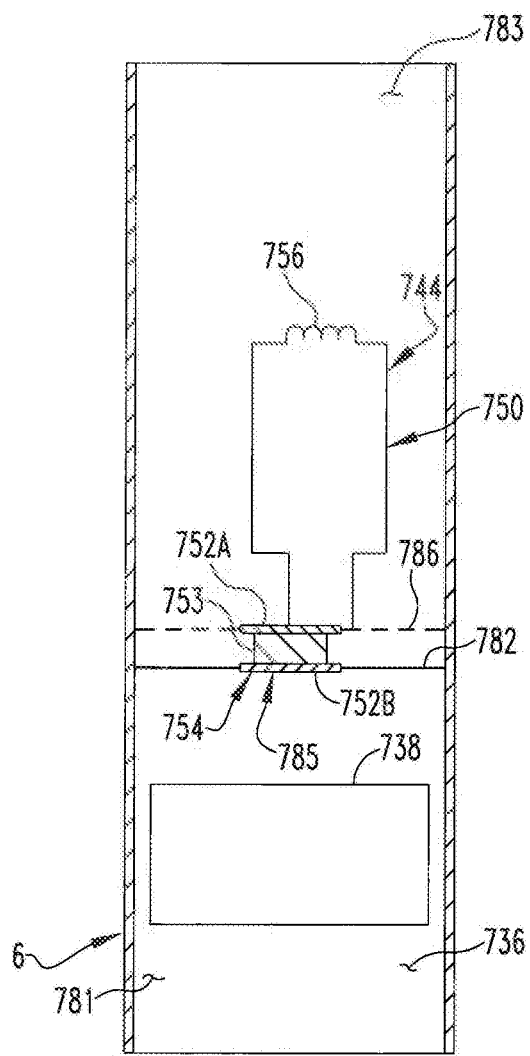
FIG. 13 is a schematic depiction of another fuel rod within which is situated another electrical circuit apparatus in accordance with an eighth embodiment of the disclosed and claimed concept.

An electrical circuit apparatus 744 in accordance with an eighth embodiment of the disclosed and claimed concept is depicted generally in FIG. 13 as being situated within an interior region 736 of a fuel rod 6. The electrical circuit apparatus includes a resonant electrical circuit 750 that includes a capacitor 754 and an inductor 756.

The electrical circuit apparatus 744 includes a pressure transmission apparatus 785 that includes a support 786 upon which the capacitor 756 is situated in a stationary fashion and further includes a flexible seal 782. More specifically, the capacitor 754 includes a pair of plates 752A and 752B with a dielectric material 753 interposed therebetween. The plate 752A is situated on the support 786, and the flexible seal extends between the plate 752B and an interior surface of the fuel rod 6 to divide the interior region 736 into a main portion 781 within which a number of fuel pellets 738 are situated and a sub-region 783 within which the inductor 756, the plate 752A, the support 786, and the dielectric 753 are situated. The support 786 is rigid but has a number of openings formed therein such that an increase or decrease in the ambient pressure within the main portion 781 will result in movement of the flexible seal 782 with respect to the support 786. The flexible seal 782 thus resists fluid communication between the main portion 781, which is the location where the fission gases are generated, and the sub-region 783.

When the main portion 781 experiences a change in the ambient pressure within the main portion 781, this causes the flexible seal 782 and the plate 752B to move with respect to the plate 752A which, being situated on the support 786, remains stationary. The dielectric material 753 is configured to be at least partially flexible in response to movement of the plate 752B with respect to the plate 752A. However, such movement of the plate 752B with respect to the plate 752A results in a change in the capacitance of the capacitor 754. This results in a corresponding change in the frequency of the response pulse 78 that is generated by the resonant electrical circuit 750 as a result of a change in the ambient pressure within the main portion 781. It thus can be understood that a change in ambient pressure within the main portion 781 of the interior region 736 correspondingly changes the frequency of the response pulse 78 that is received by the receiver 72 and which resultantly communicates a signal to the electronic processing apparatus 16. The electronic processing apparatus 16 then employs its routines 28 and its data tables 30 to determine a pressure value that corresponds with the frequency of the response pulse 78 and which is indicative of the ambient pressure within the main portion 781 of the interior region 736.

It thus can be seen that various electrical circuit apparatuses are provided that are able to directly measure parameters such as ambient pressure, centerline fuel pellet temperature, and fuel pellet elongation within the various fuel rods 6 of the fuel assembly 10. As noted, any of the electrical circuit apparatuses can include the calibration circuit that is usable to compensate for component degradation and temperature drift. In addition to the direct measurement of the parameters such as centerline fuel pellet temperature, fuel pellet elongation, and ambient pressure within the interior region of the fuel rods 6, it is reiterated that the response pulse 78 in certain circumstances can be analyzed in terms of its peak amplitude, frequency, and rate of decay in order to indirectly and simultaneously indicate a plurality the same parameters of the fuel rods 6. Other variations will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel rod for use in a nuclear reactor, the fuel rod comprising:
    a cladding defining an interior region;
    fuel pellets housed in the interior region;
    a pressure transmission apparatus configured to measure pressure within the fuel rod; and
    a resonant electrical circuit within the interior region of the cladding,
        wherein the resonant electrical circuit is configured to generate a pulse structured to travel wirelessly from the interior region through the cladding,
        wherein a frequency of the pulse varies based on pressure within the fuel rod measured by the pressure transmission apparatus, and
        wherein the frequency of the pulse is indicative of the pressure within the fuel rod.

2. The fuel rod of claim 1, wherein the pressure transmission apparatus comprises:
    a vessel defining a hollow interior and a plurality of corrugations;
    an inductor disposed around the vessel; and
    a rod disposed within the hollow interior of the vessel, wherein the rod is slidably moveable within the fuel rod, wherein movement of the rod changes an inductance of the inductor.

3. The fuel rod of claim 2, wherein the vessel is to contract with a decrease in pressure within the fuel rod and expand with an increase in the pressure within the fuel rod, wherein the rod is slidably moveable based on a change in pressure within the fuel rod.

4. The fuel rod of claim 1, wherein the pressure transmission apparatus comprises:

a tube defining a hollow cavity,
  wherein the tube is a helical shape, and
  wherein a first end of the tube defines an inlet;
a tube support to separate the interior region of the cladding into a first portion and a second portion,
  wherein the tube is in the first portion,
  wherein the inlet is in fluid communication with the second portion;
a rod disposed at a second end of the tube opposite the first end; and
a coil disposed around the rod.

5. The fuel rod of claim 4, wherein the rod is moveable based on the pressure within the second portion, wherein an inductance of the coil varies based on movement of the rod, and wherein the frequency of the pulse varies based on the inductance of the coil.

6. The fuel rod of claim 1, wherein the pressure transmission apparatus comprises:
  a tube defining a hollow cavity, wherein the tube is in a helical shape, and wherein a first end of the tube comprises a plug;
  a rod at a second end of the tube opposite the first end; and
  a coil disposed around the rod.

7. The fuel rod of claim 6, wherein the rod is slidably moveable based on contraction or expansion of the tube, wherein the tube is to contract or expand based on pressure within the interior region, wherein an inductance of the coil varies based on movement of the rod, and wherein the frequency of the pulse varies based on the inductance of the coil.

8. The fuel rod of claim 1, wherein the resonant electrical circuit further comprises:
  a capacitor comprising:
    a first plate;
    a second plate; and
    a dielectric having a dielectric constant, wherein the dielectric is disposed between the first and the second plate, and wherein the dielectric is hygroscopic.

9. The fuel rod of claim 8, wherein the dielectric is to absorb fission gases, wherein the dielectric constant varies with absorption of the fission gases, and wherein the frequency of the pulse varies based on the dielectric constant.

10. The fuel rod of claim 1, wherein the pressure transmission apparatus comprises:
  a plate support;
  a moveable seal to divide the interior region into a first portion and a second portion; and
  a capacitor comprising:
    a first plate disposed on the plate support;
    a second plate disposed on the moveable seal; and
    a dielectric disposed between the first and second plate.

11. The fuel rod of claim 10, wherein the fuel pellets are in the first portion and
  wherein a pressure increase in the first portion causes the moveable seal to move relative to the plate support.

12. The fuel rod of claim 11, wherein a capacitance of the capacitor changes with pressure, wherein the change in capacitance causes the frequency of the pulse to vary.

* * * * *

UNITED STATES PATENT AND TRADEMARK OFFICE
CERTIFICATE OF CORRECTION

| | | |
|---|---|---|
| PATENT NO. | : 12,243,660 B2 | Page 1 of 1 |
| APPLICATION NO. | : 18/481740 | |
| DATED | : March 4, 2025 | |
| INVENTOR(S) | : Jorge V. Carvajal et al. | |

It is certified that error appears in the above-identified patent and that said Letters Patent is hereby corrected as shown below:

In the Specification

Column 1, before the BACKGROUND paragraph at Line 29, please insert --GOVERNMENT CONTRACT This invention was made with government support under Contract DE-NE0008824 awarded by the Department of Energy. The government has certain rights in the invention.--.

Signed and Sealed this
Twenty-sixth Day of August, 2025

Coke Morgan Stewart
*Acting Director of the United States Patent and Trademark Office*